United States Patent
Zhang et al.

(10) Patent No.: US 11,255,800 B1
(45) Date of Patent: Feb. 22, 2022

(54) X-RAY SINGLE-PIXEL CAMERA BASED ON X-RAY COMPUTATIONAL CORRELATED IMAGING

(71) Applicant: INSTITUTE OF PHYSICS, CHINESE ACADEMY OF SCIENCES, Beijing (CN)

(72) Inventors: Aixin Zhang, Beijing (CN); Yuhang He, Beijing (CN); Lingan Wu, Beijing (CN); Liming Chen, Beijing (CN); Bingbing Wang, Beijing (CN)

(73) Assignee: INSTITUTE OF PHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/413,729

(22) PCT Filed: Dec. 10, 2019

(86) PCT No.: PCT/CN2019/124392
§ 371 (c)(1),
(2) Date: Jun. 14, 2021

(87) PCT Pub. No.: WO2020/119690
PCT Pub. Date: Jun. 18, 2020

(30) Foreign Application Priority Data

Dec. 14, 2018 (CN) .......................... 201811536901.7

(51) Int. Cl.
*G01N 23/04* (2018.01)
*G01N 23/20* (2018.01)

(52) U.S. Cl.
CPC ........... *G01N 23/043* (2013.01); *G01N 23/20* (2013.01); *G01N 2223/03* (2013.01);
(Continued)

(58) Field of Classification Search
None
See application file for complete search history.

(56) References Cited

U.S. PATENT DOCUMENTS

2016/0310098 A1 10/2016 Kim
2017/0261442 A1* 9/2017 Yun ........................ A61B 6/508
(Continued)

FOREIGN PATENT DOCUMENTS

CN 101699312 A 4/2010
CN 103323396 A 9/2013
(Continued)

OTHER PUBLICATIONS

International Search Report for PCT/CN2019/124392 (ISA/CN) dated Feb. 26, 2020 (4 pages).
Written Opinion of the International Searching Authority for PCT/CN2019/124392 (ISA/CN) dated Feb. 26, 2020 (3 pages).

*Primary Examiner* — Hoon K Song
(74) *Attorney, Agent, or Firm* — Alston & Bird LLP

(57) ABSTRACT

An X-ray single-pixel camera based on X-ray computational correlated imaging, which belongs to the technical research fields of X-ray computational correlated imaging and X-ray single-pixel imaging. The X-ray single-pixel camera includes: an X-ray modulation system (3), an X-ray modulation control system (4), an X-ray single-pixel detector (5), a main control system unit (6), a time synchronization system (7) and a computational imaging system (8). The main control system unit (6) controls each module through software; the time synchronization system (7) controls synchronization of each module for automatic collection; and the computational imaging system (8) is configured to perform a second-order correlated computation or a compressed sensing computation or a deep learning computation on the signals collected by the X-ray single-pixel detector (5) and a preset modulation matrix, so as to obtain an image of an object under test. The X-ray single-pixel camera based (Continued)

on X-ray computational correlated imaging, provided by the present invention, realizes single-pixel imaging, greatly reduces the sampling number while ensuring the imaging quality, and reduces the X-ray radiation dose in an imaging process.

10 Claims, 2 Drawing Sheets

(52) U.S. Cl.
CPC ............... *G01N 2223/1016* (2013.01); *G01N 2223/306* (2013.01); *G01N 2223/401* (2013.01); *G01N 2223/42* (2013.01)

(56) References Cited

U.S. PATENT DOCUMENTS

| | | | | |
|---|---|---|---|---|
| 2019/0340497 | A1* | 11/2019 | Baraniuk | G06K 9/6274 |
| 2021/0010955 | A1* | 1/2021 | Shwartz | G01N 23/20008 |

FOREIGN PATENT DOCUMENTS

| | | |
|---|---|---|
| CN | 103363924 A | 10/2013 |
| CN | 103777206 A | 5/2014 |
| CN | 105227815 A | 1/2016 |
| CN | 106526602 A | 3/2017 |
| CN | 108447113 A | 8/2018 |
| CN | 108827988 A | 11/2018 |

\* cited by examiner

X-RAY SINGLE-PIXEL CAMERA BASED ON X-RAY COMPUTATIONAL CORRELATED IMAGING

TECHNICAL FIELD

The present invention relates to the technical research fields of X-ray computational correlated imaging and X-ray single-pixel imaging, and in particular, to an X-ray single-pixel camera based on X-ray computational correlated imaging.

BACKGROUND ART

As a light source with high penetrability, X-rays can quickly realize non-invasive imaging of samples. X-ray imaging, as a powerful imaging diagnostic technology, has been widely used in the fields of industry, medicine and basic scientific research. However, as a type of electromagnetic wave of short wavelength and high photon energy, X-rays can cause radiation damage when obtaining the internal structure of a sample. For example, in the field of medicine, the probability of cancerization of cells receiving too much radiation will greatly increase. Therefore, how to reduce the radiation dose of X-rays while ensuring the image quality is a problem that people are concerned about. In addition, a large-area array high-pixel X-ray detector has a complex structure, and its high cost can bring certain economic pressure to the fields of industry, medicine and basic scientific research.

X-ray correlated imaging combined with correlated imaging technology can well solve the problem of high-energy radiation of X-rays, and thus reduce the requirements for an X-ray detector. Intensity correlated imaging, as an indirect imaging manner, has developed rapidly because of its unique properties since it was first implemented in the laboratory using quantum light sources in 1995. This non-localized imaging manner subverts the perception of people for traditional imaging: an image of an object can be retrieved by beam splitting determination or pre-setting of the distribution of a light field irradiating the object, and then performing statistical correlated computation on the distribution of the light field and the total transmitted (or reflected) light intensity passing through the object. In this way, the light energy does not have to be distributed on each pixel of an area array detector, so as to improve the intensity of the light signal of the object, thus reducing the influence of shot noise, and improving the signal-to-noise ratio. The difference in imaging principle makes the ghost imaging method capable of realizing not only ultra-high resolution imaging but also imaging under extremely low light compared with traditional imaging. However, the wavelength of X-rays is too short, and there is no suitable spatial light modulation device to perform known and controllable modulation on the light field, and therefore, the currently reported experiments on X-ray ghost imaging all use randomly modulated pseudothermal light; not only is a large-area array X-ray detector required to pre-measure the modulated light field, but also a large number of exposure frames are required to restore the image of the object, and the imaging quality is poor.

SUMMARY OF THE INVENTION

One objective of the present invention is to provide an X-ray single-pixel camera based on X-ray computational correlated imaging aimed at the above defects existing in the prior art, which can perform a controllable and specific modulation on X-rays and realize X-ray computational correlated imaging.

Another objective of the present invention is to provide an X-ray single-pixel camera based on X-ray computational correlated imaging, so as to realize single-pixel imaging, greatly reduce the number of exposure frames while ensuring the imaging quality, and reduce the X-ray radiation dose in an imaging process.

In particular, the present invention provides an X-ray single-pixel camera based on X-ray computational correlated imaging, including: an X-ray modulation system, an X-ray modulation control system, an X-ray single-pixel detector, a main control system unit, a time synchronization system and a computational imaging system.

The X-ray modulation system is configured to modulate X-rays; the X-ray modulation control system is configured to control the X-ray modulation system; the X-ray single-pixel detector is configured to collect signals; the main control system unit controls each module through software; the time synchronization system controls synchronization of each module for automatic collection; and the computational imaging system is configured to perform a second-order correlated computation or a compressed sensing computation or a deep learning computation on the signals collected by the X-ray single-pixel detector and a preset modulation matrix, so as to obtain an image of an object under test.

Optionally, the X-ray single-pixel camera further includes an X-ray source for emitting X-rays.

Optionally, an object under test is placed between the X-ray source and the X-ray modulation system for exposure.

Optionally, an object under test is placed between the X-ray modulation system and the X-ray single-pixel detector for exposure.

Optionally, the X-ray modulation system includes a modulation matrix, and the modulation matrix includes a plurality of matrix units; any one of the matrix units is hollowed out with different preset patterns on an X-ray absorption material; and the X-ray modulation control system controls a movement of the X-ray modulation system, so that X-rays irradiate one of the matrix units to form an X-ray pattern with the same distribution as the preset patterns.

Optionally, the X-ray modulation system includes a modulation matrix, and the modulation matrix includes a plurality of matrix units; any one of the matrix units is made of a material performing a phase modulation on X-rays; and the X-ray modulation control system controls a movement of the X-ray modulation system, so that X-rays irradiate one of the matrix units to form an X-ray pattern distributed corresponding to the preset patterns.

Optionally, the X-ray absorption material is a material capable of absorbing X-rays, including iron and an elemental simple substance with a high atomic number after iron in a periodic table of elements or a compound thereof; the simple substance includes any one of iron, cobalt, nickel, copper, zinc, molybdenum, silver, cadmium, tin, tantalum, tungsten, platinum, gold, and lead; and the compound includes any one of iron oxide, copper oxide, zinc oxide and silver iodide.

Optionally, the main control system unit triggers the X-ray modulation control system through software control so that X-rays irradiate different matrix units of the X-ray modulation system, and the X-ray single-pixel detector is controlled through software to perform a signal collection.

The time synchronization system sets a time sequence to enable the software to first trigger the X-ray modulation control system so that X-rays irradiate different matrix units of the X-ray modulation system, and then, the software is set to trigger the X-ray single-pixel detector to perform a signal collection.

Optionally, the image of the object under the second-order correlated computation is obtained by the following formula:

$$Image(\eta, \xi) = \langle I(\eta, \xi)S \rangle - \langle I(\eta, \xi) \rangle \langle S \rangle$$

$$= \sum_{i=1}^{N} \frac{I_i(\eta, \xi)S_i}{N} - \sum_{i=1}^{N} \frac{I_i(\eta, \xi)}{N} \sum_{i=1}^{N} \frac{S_i}{N},$$

wherein $I_i(\eta,\xi)$ is each set modulation matrix; i is a positive integer less than a total sampling number N; and the light intensity detected by a bucket detector after each corresponding modulation matrix irradiates the object is denoted by $S_i$.

Optionally, a collection process of the compressed sensing computation is a linear projection process as shown below:

$$A = \begin{pmatrix} I_{1,1} & I_{1,2} & \cdots & I_{1,M} \\ I_{2,1} & I_{2,2} & \cdots & I_{2,M} \\ \cdots & \cdots & \cdots & \cdots \\ I_{N,1} & I_{N,2} & \cdots & I_{N,M} \end{pmatrix}$$

$$y = Ax$$

$$\begin{pmatrix} y_1 \\ y_2 \\ \cdots \\ y_N \end{pmatrix} = \begin{pmatrix} I_{1,1} & I_{1,2} & \cdots & I_{1,M} \\ I_{2,1} & I_{2,2} & \cdots & I_{2,M} \\ \cdots & \cdots & \cdots & \cdots \\ I_{N,1} & I_{N,2} & \cdots & I_{N,M} \end{pmatrix} \times \begin{pmatrix} x_1 \\ x_2 \\ \cdots \\ x_M \end{pmatrix},$$

wherein in N measurements, an M pixel image that represents an object can be represented by a one-dimensional vector $x=(x_1, x_2, \ldots, x_M)$; A is a two-dimensional matrix representing the modulation matrix $I_i(\eta,\xi)$; $S_i$ is the light intensity detected each time; and $S_i$ is represented by a one-dimensional vector $y=(y_1, y_2, \ldots, y_N)$. The problem of compressed sensing is to solve an underdetermined system of equations y=A x based on the known measurement value y and measurement matrix A, so as to obtain the original signal M pixel image x.

Optionally, the deep learning computation includes the following steps:
 inputting a series of functions as models to be trained;
 evaluating a quality of each function using an error rate as a standard; and
 comparing an output of each function with a correct result to select an optimal matching function.

The X-ray single-pixel camera based on X-ray computational correlated imaging, provided by the present invention, uses a special measurement matrix to perform a controllable and known modulation on an original X-ray image under test, or projects the speckles modulated by the special measurement matrix on an object; the total light intensity received by the X-ray single-pixel detector together with the measurement matrix are subjected to an intensity correlation algorithm for image restoration, so that the requirements for imaging detectors can be greatly reduced in the case of obtaining the same resolution, which is of great significance for reducing the cost of X-ray imaging devices.

In addition, compared with a random measurement matrix, the X-ray single-pixel camera based on X-ray computational correlated imaging, provided by the present invention, has the advantages that a special matrix can obtain an image with a higher contrast-to-noise ratio while the number of measurements is less, and can greatly reduce the number of measurements for an image with the same contrast-to-noise ratio, thereby reducing the radiation dose received by a sample, which is of great significance in the medical field.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn to scale. In the drawings.

DETAILED DESCRIPTION OF THE INVENTION

The present invention will be further described below with reference to the figures and implementation manners. However, the protection scope of the present invention is not limited to the following examples, and should include all of the contents in the claims.

The inventors of the present invention found in research that: in the prior art, experiments on X-ray ghost imaging all use randomly modulated pseudothermal light; not only is a large-area array X-ray detector required to pre-measure a modulated light field, but also a large number of exposure frames are required to reconstruct an image of an object, and the imaging effect is poor. The reason is that the wavelength of X-rays is too short, and them is no suitable spatial light modulation device to perform a known and controllable modulation on the light field. Therefore, on the basis of an in-depth research on how to perform a controllable and specific modulation on X-rays, the inventors proposed the design of the present invention by implementing a method of X-ray computational correlated imaging. The design of the present invention not only can really realize single-pixel imaging, but also can greatly reduce the sampling number while ensuring the imaging quality, and reduce the X-ray radiation dose in an imaging process.

Figure 1:
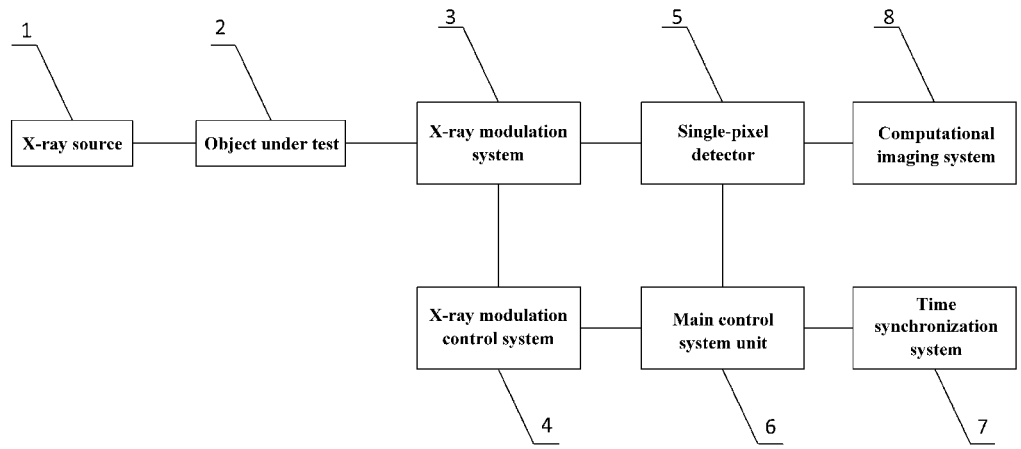
FIG. 1 is a schematic composition diagram of an X-ray single-pixel camera based on X-ray computational correlated imaging according to an embodiment of the present invention.
Figure 2:
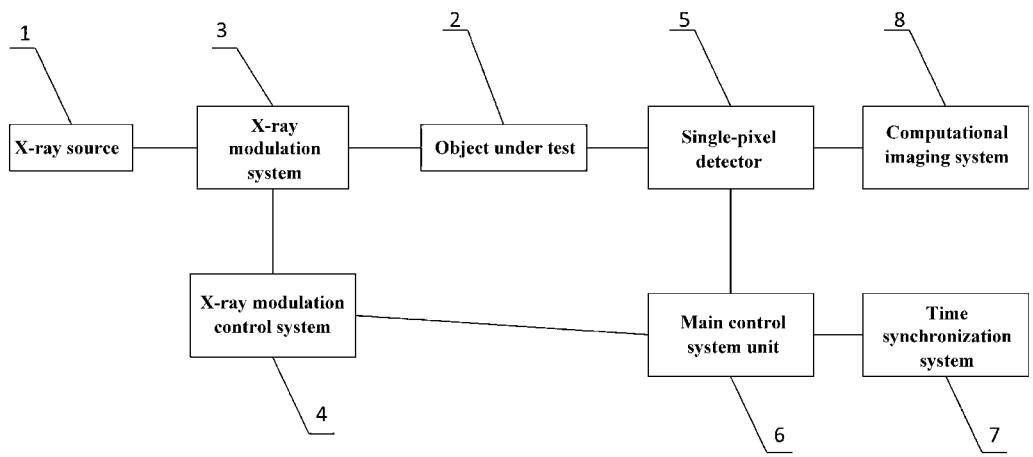
FIG. 2 is a schematic composition diagram of an X-ray single-pixel camera based on X-ray computational correlated imaging according to another embodiment of the present invention.
Figure 3:
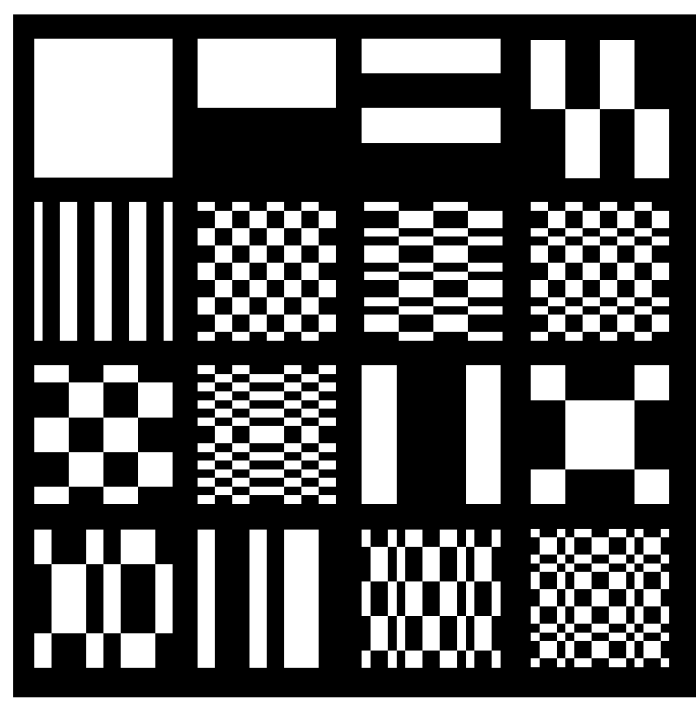
FIG. 3 is a schematic structural diagram of a modulation matrix of an X-ray modulation control system according to an embodiment of the present invention.

FIG. 1 is a schematic composition diagram of an X-ray single-pixel camera based on X-ray computational correlated imaging according to an embodiment of the present invention. FIG. 2 is a schematic composition diagram of an X-ray single-pixel camera based on X-ray computational correlated imaging according to another embodiment of the present invention. FIG. 3 is a schematic structural diagram of a modulation matrix of an X-ray modulation control system according to an embodiment of the present invention. The present invention will be described in detail below with reference to FIG. 1 to FIG. 3. As shown in FIG. 1 and FIG. 2, an X-ray single-pixel camera based on X-ray computational correlated imaging, provided by the present invention, may generally include: an X-ray modulation system 3, an X-ray modulation control system 4, an X-ray single-pixel detector 5, a main control system unit 6, a time synchronization system 7 and a computational imaging system 8. The X-ray modulation system 3 is configured to modulate X-rays. The X-ray modulation control system 4 is configured to control the X-ray modulation system 3. The X-ray single-pixel detector 5 is configured to collect signals. The main control system unit 6 controls each module through software. The time synchronization system 7 controls synchronization of each module for automatic collection. The computational imaging system 8 is configured to perform a second-order correlated computation or a compressed sensing computation or a deep learning computation on the signals collected by the X-ray single-pixel detector 5 and a preset modulation matrix, so as to obtain an image of an object 2 under test.

Specifically, the X-ray single-pixel camera further includes an X-ray source 1 for emitting X-rays. The X-ray source 1 emits X-rays which irradiate the object 2 under test and then irradiate the X-ray modulation system 3, so that the X-ray modulation system 3 modulates the X-rays in space or in phase to generate known and controllable X-ray patterns. In an optional implementation manner, the object 2 under test is placed between the X-ray source 1 and the X-ray modulation system 3 for exposure. In another optional implementation manner, the object 2 under test is placed between the X-ray modulation system 3 and the X-ray single-pixel detector 4 for exposure.

The X-ray modulation system 3 includes a modulation matrix. The modulation matrix includes a plurality of matrix units, and every matrix unit is hollowed out with different preset patterns on an X-ray absorption material. FIG. 3 shows a schematic structural diagram of a modulation matrix of an X-ray modulation control system. FIG. 3 includes a total of 4*4 matrix units, and each matrix unit has a different preset pattern. The black part represents the modulation material, including but not limited to materials based on X-ray absorption. If the black part is a material capable of absorbing X-rays, the material may be a metal plate. The white part represents the hollowed part through which X-rays can pass through. The X-ray modulation system 3 allows some X-rays from the X-ray source to pass through each modulation matrix, which aims to enable uniform X-rays to be subjected to spatial modulation, so as to generate known and controllable X-ray patterns to irradiate the object. Therefore, in order to generate known and controllable X-ray patterns, the material of the X-ray modulation system 3 needs to be capable of absorbing X-rays (such as metals, for example copper, iron or gold), or has certain phase modulation on X-rays. Here, a metal plate based on X-ray absorption is taken as an example. First, the modulation matrixes need to be hollowed out of the metal plate one by one as the X-ray modulation system 3. Then, uniform X-rays irradiate a certain modulation matrix of the X-ray modulation system 3, so that an X-ray pattern with the same distribution can be formed behind the X-ray modulation system 3. The X-ray modulation system 3 is moved through the X-ray modulation control system 4 to enable X-rays to irradiate different modulation matrixes of the X-ray modulation system 3, so that different X-ray patterns with known distribution can be formed.

The X-ray modulation control system 4 controls the movement of the X-ray modulation system 3, so that X-rays irradiate one of the matrix units to form an X-ray pattern which is the same as the preset pattern or distributed corresponding to the matrix unit. The X-ray absorption material is a material capable of absorbing X-rays, including iron and an elemental simple substance with a high atomic number after iron in the periodic table of elements or a compound thereof. The simple substance includes, but is not limited to, any one of iron, cobalt, nickel, copper, zinc, molybdenum, silver, cadmium, tin, tantalum, tungsten, platinum, gold and lead. The compound includes, but is not limited to, any one of iron oxide, copper oxide, zinc oxide and silver iodide.

In another specific implementation solution, the modulation matrix includes a plurality of matrix units, and each of the matrix units is made of a material performing a phase modulation on X-rays. The X-ray modulation control system 4 controls the movement of the X-ray modulation system 3, so that X-rays irradiate one matrix unit to form an X-ray pattern distributed corresponding to the matrix unit. The matrix unit performs a predictable modulation on the phase of X-rays, so that the obtained X-ray pattern is also predictable. The material capable of performing a phase modulation on X-rays includes glass and the like.

The main control system unit 6 controls each module through software. That is, the X-ray modulation control system 4 is triggered through software control so that X-rays irradiate different matrix units of the X-ray modulation system 3, and the X-ray single-pixel detector 5 is controlled through the software to perform a signal collection. The time synchronization system 7 sets a time sequence to enable the software to first trigger the X-ray modulation control system 4 so that X-rays irradiate different matrix units of the X-ray modulation system 3, and then, the software is set to trigger the X-ray single-pixel detector 5 to perform a signal collection.

In the X-ray single-pixel camera based on X-ray computational correlated imaging, provided by the present invention, each set modulation matrix is marked as $I_i(\eta,\xi)$; i is a positive integer less than the total sampling number N; and the light intensity detected by a bucket detector after each corresponding modulation matrix irradiates the object is marked as $S_i$. The image of the object under the second-order correlated computation can be obtained by the following formula:

$$Image(\eta, \xi) = \langle I(\eta, \xi)S \rangle - \langle I(\eta, \xi)\rangle\langle S \rangle$$

$$= \sum_{i=1}^{N} \frac{I_i(\eta, \xi)S_i}{N} - \sum_{i=1}^{N} \frac{I_i(\eta, \xi)}{N} \sum_{i=1}^{N} \frac{S_i}{N},$$

The compressed sensing computation comprises: the collection process, which is a linear projection process as shown below:

$$A = \begin{pmatrix} I_{1,1} & I_{1,2} & \cdots & I_{1,M} \\ I_{2,1} & I_{2,2} & \cdots & I_{2,M} \\ \cdots & \cdots & \cdots & \cdots \\ I_{N,1} & I_{N,2} & \cdots & I_{N,M} \end{pmatrix}$$

-continued $$y = Ax$$

$$\begin{pmatrix} y_1 \\ y_2 \\ \cdots \\ y_N \end{pmatrix} = \begin{pmatrix} I_{1,1} & I_{1,2} & \cdots & I_{1,M} \\ I_{2,1} & I_{2,2} & \cdots & I_{2,M} \\ \cdots & \cdots & \cdots & \cdots \\ I_{N,1} & I_{N,2} & \cdots & I_{N,M} \end{pmatrix} \times \begin{pmatrix} x_1 \\ x_2 \\ \cdots \\ x_M \end{pmatrix},$$

wherein in N measurements, an M pixel image that represents an object can be represented by a one-dimensional vector $x=(x_1, x_2, \ldots, x_M)$; A is a two-dimensional matrix representing the modulation matrix $I_i(\eta,\xi)$; $S_i$ is the light intensity detected each time; and $S_i$ is represented by a one-dimensional vector $y=(y_1, y_2, \ldots, y_N)$. The problem of compressed sensing is to solve an underdetermined system of equations $y=A x$ based on the known measurement value y and measurement matrix A, so as to obtain the original signal M pixel image x.

Deep learning is a method based on representative learning of data in machine learning. The observed value (referring to the image of the object in the present invention) can be expressed in many ways, such as a vector of each pixel intensity value, or more abstractly expressed as a series of edges, regions of specific shapes, and the like. It is easier to learn tasks from examples using certain specific representation methods, such as acquiring object information from noise.

The process of deep learning is a process of high-level abstraction of data using a plurality of processing layers to obtain multiple non-linear transformation functions. For now, deep learning is mainly combined with artificial neural networks, so the deep learning algorithm framework here can also become a deep neural network algorithm framework.

Deep learning simulates the working principle of the human brain by constructing a deep neural network. The deep neural network consists of an input layer, a plurality of hidden layers and an output layer. Each layer has a plurality of neurons, and there are connection weights between the neurons. Each neuron simulates a human nerve cell, and the connection between nodes simulates the connection between nerve cells. The deep learning computation includes the following steps:
  inputting a series of functions as models to be trained;
  evaluating a quality of each function using an error rate as a standard; and
  comparing an output of each function with a correct result to select an optimal matching function.

The principle of the working process of the X-ray single-pixel camera based on X-ray computational correlated imaging, provided by the present invention, is as follows: after the X-ray source 1 irradiates the object 2 under test, an image under test is projected onto the X-ray modulation system 3. The X-ray modulation system 3 comprises a modulation material on which all preset modulation matrices are engraved, wherein the modulation material can absorb X-rays or perform a certain phase modulation on X-rays. For example, the modulation material is a metal plate. The smallest modulation unit in the modulation matrix determines the resolution of the X-ray single-pixel camera. The X-ray modulation control system 4 controls the image of the object under test to be projected onto each modulation matrix on the X-ray modulation system 3 in sequence, or the X-ray modulation control system 4 controls each modulation matrix on the X-ray modulation system 3 to be projected onto the object under test, thereby forming a known and controllable modulation on the image under test. The single-pixel detector 5 is configured to collect the total light intensity after the X-ray modulation system 3 modulates the image under test. All modules have corresponding control software integrated into the main control system unit 6, and the time synchronization system 7 is designed through the sequence of experimental logic to realize an automatic collection. After the collection is completed, the computational imaging system 8 performs a second-order correlation computation or a compressed sensing computation or a deep learning computation on the light intensity sequence collected by the single-pixel detector 5 and the preset modulation matrix (that is, the modulation matrix engraved on the X-ray modulation system 3), and finally, the image of the object under test is obtained.

The X-ray single-pixel camera based on X-ray computational correlated imaging, provided by the present invention, uses a special measurement matrix to perform a controllable and known modulation on an original X-ray image under test, or projects the speckles modulated by the special measurement matrix on an object; the total light intensity received by the X-ray single-pixel detector together with the measurement matrix are subjected to an intensity correlation algorithm for image restoration, so that the requirements for imaging detectors can be greatly reduced in the case of obtaining the same resolution, which is of great significance for reducing the cost of X-ray imaging devices.

In addition, compared with a random measurement matrix, the X-ray single-pixel camera based on X-ray computational correlated imaging, provided by the present invention, has the advantages that a special matrix can obtain an image with a higher contrast-to-noise ratio while the number of measurements is less, or can greatly reduce the number of measurements for an image with the same contrast-to-noise ratio, thereby reducing the radiation dose received by a sample, which is of great significance in the medical field.

So far, those skilled in the art should recognize that although various exemplary embodiments of the present invention have been shown and described in detail herein, many other variations or modifications consistent with the principles of the present invention still can be directly determined or derived according to the disclosed contents of the present invention without departing from the spirit and scope of the present invention. Therefore, the scope of the present invention should be understood and deemed to cover all these other variations or modifications.

The invention claimed is:

1. An X-ray single-pixel camera based on X-ray computational correlated imaging, characterized by comprising: an X-ray modulation system, an X-ray modulation control system, an X-ray single-pixel detector, a main control system unit, a time synchronization system and a computational imaging system, wherein
  the X-ray modulation system is configured to modulate X-rays; the X-ray modulation control system is configured to control the X-ray modulation system; the X-ray single-pixel detector is configured to collect signals; the main control system unit controls each module through software; the time synchronization system controls synchronization of each module for automatic collection; and the computational imaging system is configured to perform a second-order correlated computation or a compressed sensing computation or a deep learning computation on the signals collected by the X-ray single-pixel detector and a preset modulation matrix, so as to obtain an image of an object under test.

2. The X-ray single-pixel camera according to claim 1, characterized by further comprising an X-ray source for emitting X-rays, wherein an object under test is placed between the X-ray source and the X-ray modulation system for exposure.

3. The X-ray single-pixel camera according to claim 1, characterized by further comprising an X-ray source for emitting X-rays, wherein an object under test is placed between the X-ray modulation system and the X-ray single-pixel detector for exposure.

4. The X-ray single-pixel camera according to claim 1, characterized in that the X-ray modulation system comprises a modulation matrix, and the modulation matrix comprises a plurality of matrix units; any one of the matrix units is hollowed out with different preset patterns on an X-ray absorption material; and the X-ray modulation control system controls a movement of the X-ray modulation system, so that X-rays irradiate one of the matrix units to form an X-ray pattern with the same distribution as the preset patterns.

5. The X-ray single-pixel camera according to claim 4, characterized in that the X-ray modulation system comprises a modulation matrix, and the modulation matrix comprises a plurality of matrix units; any one of the matrix units is made of a material performing a phase modulation on X-rays; and the X-ray modulation control system controls a movement of the X-ray modulation system, so that X-rays irradiate one of the matrix units to form an X-ray pattern distributed corresponding to the matrix unit.

6. The X-ray single-pixel camera according to claim 4, characterized in that the X-ray absorption material is a material capable of absorbing X-rays, comprising iron and an elemental simple substance with a high atomic number after iron in a periodic table of elements or a compound thereof; the simple substance comprises any one of iron, cobalt, nickel, copper, zinc, molybdenum, silver, cadmium, tin, tantalum, tungsten, platinum, gold and lead; and the compound comprises any one of iron oxide, copper oxide, zinc oxide and silver iodide.

7. The X-ray single-pixel camera according to claim 4, characterized in that the main control system unit triggers the X-ray modulation control system through software control so that X-rays irradiate different matrix units of the X-ray modulation system, and the X-ray single-pixel detector is controlled through software to perform a signal collection; and the time synchronization system sets a time sequence to enable the software to first trigger the X-ray modulation control system so that X-rays irradiate different matrix units of the X-ray modulation system, and then the software is set to trigger the X-ray single-pixel detector to perform a signal collection.

8. The X-ray single-pixel camera according to claim 1, characterized in that the image of the object under the second-order correlated computation is obtained by the following formula:

$$Image(\eta, \xi) = \langle I(\eta, \xi)S \rangle - \langle I(\eta, \xi)\rangle\langle S\rangle$$
$$= \sum_{i=1}^{N} \frac{I_i(\eta, \xi)S_i}{N} - \sum_{i=1}^{N} \frac{I_i(\eta, \xi)}{N} \sum_{i=1}^{N} \frac{S_i}{N},$$

wherein $I_i(\eta,\xi)$ is each set modulation matrix; i is a positive integers less than a total sampling number N; and the light intensity detected by a bucket detector after each corresponding modulation matrix irradiates the object is denoted by $S_i$.

9. The X-ray single-pixel camera according to claim 1, characterized in that a collection process of the compressed sensing is a linear projection process as shown below:

$$A = \begin{pmatrix} I_{1,1} & I_{1,2} & \cdots & I_{1,M} \\ I_{2,1} & I_{2,2} & \cdots & I_{2,M} \\ \cdots & \cdots & \cdots & \cdots \\ I_{N,1} & I_{N,2} & \cdots & I_{N,M} \end{pmatrix}$$

$$y = Ax$$

$$\begin{pmatrix} y_1 \\ y_2 \\ \cdots \\ y_N \end{pmatrix} = \begin{pmatrix} I_{1,1} & I_{1,2} & \cdots & I_{1,M} \\ I_{2,1} & I_{2,2} & \cdots & I_{2,M} \\ \cdots & \cdots & \cdots & \cdots \\ I_{N,1} & I_{N,2} & \cdots & I_{N,M} \end{pmatrix} \times \begin{pmatrix} x_1 \\ x_2 \\ \cdots \\ x_M \end{pmatrix},$$

wherein in N measurements, an M pixel image that represents an object can be represented by a one-dimensional vector $x=(x_1, x_2, \ldots, x_M)$; A is a two-dimensional matrix representing the modulation matrix $I_i(\eta,\xi)$; $S_i$ is the light intensity detected each time; and $S_i$ is represented by a one-dimensional vector $y=(y_1, y_2, \ldots, y_N)$.

10. The X-ray single-pixel camera according to claim 1, characterized in that the deep learning computation comprises the following steps:

inputting a series of functions as models to be trained;
evaluating a quality of each function using an error rate as a standard; and
comparing an output of each function with a correct result to select an optimal matching function.

* * * * *